United States Patent
Eguchi et al.

(10) Patent No.: US 7,295,337 B2
(45) Date of Patent: Nov. 13, 2007

(54) FACSIMILE APPARATUS THAT SAVES IMAGE DATA IN AN EXTERNAL DEVICE THROUGH A NETWORK

(75) Inventors: Masashi Eguchi, Joyo (JP); Hideji Akiyama, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1057 days.

(21) Appl. No.: 10/324,839

(22) Filed: Dec. 20, 2002

(65) Prior Publication Data

US 2003/0117666 A1   Jun. 26, 2003

(30) Foreign Application Priority Data

Dec. 26, 2001   (JP)   ............................. 2001-393048
Dec. 28, 2001   (JP)   ............................. 2001-399141

(51) Int. Cl.
*G06F 3/12*   (2006.01)
*H04N 1/00*   (2006.01)

(52) U.S. Cl. ..................... 358/1.15; 358/402; 358/403; 358/1.16

(58) Field of Classification Search ............... 358/1.15, 358/1.16, 1.17, 1.13, 1.14, 1.18, 1.1, 404, 358/444, 407, 468, 400, 402, 403, 524; 707/1, 707/6, 10, 104.1, 204
See application file for complete search history.

(56) References Cited

U.S. PATENT DOCUMENTS 6,823,367 B1 * 11/2004 Wakasugi et al. ........... 709/206

FOREIGN PATENT DOCUMENTS

| JP | 407046271 A | * | 2/1995 |
| JP | 07-121410 | | 5/1995 |
| JP | 08-228246 | | 9/1996 |
| JP | 09/200482 | | 7/1997 |
| JP | 10-154228 | | 6/1998 |
| JP | 11-055494 | | 2/1999 |
| JP | 11-136277 | | 5/1999 |
| JP | 2000-235532 | | 8/2000 |
| JP | 2001-109682 | | 4/2001 |
| JP | 2001-155012 | | 6/2001 |
| JP | 2001-344178 | | 12/2001 |

* cited by examiner

*Primary Examiner*—Dov Popovici
(74) *Attorney, Agent, or Firm*—Hogan & Hartson LLP

(57) ABSTRACT

A facsimile apparatus includes an image data communication unit that transmits and receives image data, an accumulation unit that accumulates transmitted and received image data, and a transmission unit that transmits the image data accumulated in the accumulation unit to an e-mail address for archiving. A controller determines whether a predetermined execution time is coming and transmits the image data accumulated in the accumulation unit to the transmission unit.

22 Claims, 13 Drawing Sheets

FIG.3

Archive Management Record

| Communication Time | Destination | Number of Page | Document Size | Resolution | Communication Result | Archive Destination |
|---|---|---|---|---|---|---|
| 2001/09/01 21:30:45 | 075-1234-5678 | 1 | A4 | Fine | OK | FAX@aaa.com |
| 2001/09/01 21:31:45 | 075-0000-1111 | 2 | A4 | Standard | OK | FAX@aaa.com |
| 2001/09/01 21:32:45 | 075-1111-2222 | 5 | A3 | Super Fine | Error | FAX@aaa.com |
| 2001/09/01 21:35:45 | 075-2222-3333 | 5 | A3 | Super Fine | OK | FAX@aaa.com |
| 2001/09/02 09:30:45 | 075-3333-5678 | 1 | A4 | Fine | OK | FAX@aaa.com |
| 2001/09/02 09:32:00 | 075-2222-1111 | 2 | A4 | Standard | OK | FAX@aaa.com |
| 2001/09/02 09:36:23 | 075-1111-9999 | 5 | A3 | Super Fine | Error | |
| | | | | | | |

| CONDITION | KEYWORD |
|---|---|
| TSI=075-1234-5678 | KYOTO BRANCH |
| from=aaa@***.com | OSAKA BRANCH |
| subject=circulate | INTERNAL CIRCULATION |
| sub address=333 | FOR INTERNAL USE ONLY |

FACSIMILE APPARATUS THAT SAVES IMAGE DATA IN AN EXTERNAL DEVICE THROUGH A NETWORK

BACKGROUND OF THE INVENTION

1. Field of the Invention

The present invention relates to a facsimile apparatus, which has a function of saving transmitted or received image data all at once or saving the image data selectively in an external memory device through a network such as a LAN.

2. Description of the Related Art

The conventional facsimile apparatus is connected to an archive terminal device that can receive an e-mail through a network. The conventional facsimile apparatus saves the image data transmitted or received by facsimile or by an e-mail attached image data (hereafter called Internet facsimile), and has a function of saving (archiving) the transmitted or received image data in the archive terminal device. As transmitted or received image data is saved in the external device, the facsimile apparatus does not need to have a large storage capacity, and the transmitted or received image data can be saved safely.

The facsimile apparatus archives transmitted or received image data, regardless whether or not the traffic is high in a network that becomes a transmission path to the archive terminal device such as a LAN (Local Area Network) or the Internet, so that the communication status may worsen if the traffic in the network such as the LAN or the Internet is high. The status may then affect operating effectiveness throughout the company if the LAN is used as the network in the company.

The archive terminal device can easily save about ten to twenty accumulated image data received from the facsimile apparatus, however the burden is increased in operating and managing the terminal device when the archive device saves about 1000 to 2000 image data. Thus, the burden has been tried to be relieved.

The facsimile apparatus saves the entire transmitted image data in the archive terminal device regardless whether or not the transmitted document (image data) reaches the destination. Thus, the image data that does not reach the destination is also saved though it may not need to be saved, so that memory resources may be wasted in the archive terminal device. Moreover, it may be inconvenient to manage the saved image data, as it is difficult to identify whether the saved image data has reaches the destination.

SUMMARY OF THE INVENTION

An advantage of the present invention is that a facsimile apparatus, which archives transmitted or received image date after transmitting to a predetermined e-mail address, is capable of using communications line more smoothly, and increases the efficiency in managing the accumulated image data.

Another advantage of the present invention is that a facsimile apparatus, which has a function of archiving image data transmitted to a predetermined e-mail address, archives only image data that has reached a destination and enhances the convenience in managing the saved image data.

A first aspect of the present invention is that a facsimile apparatus accumulates image data transmitted or received by facsimile or by facsimile via an Internet, and transmits the entire accumulated image data to an e-mail address for archiving at predetermined execution times. Thus, the e-mails are accumulated with the respective execution times in the archive terminal device, and the efficiency is improved when managing the transmitted or received image data. A time set by a user or a time when the amount of transmitted or received image data accumulated in the apparatus reaches a set amount is used as the execution time. Consequently, the transmitted or received image data can be managed with a predetermined period, or desired image data can be searched from accumulated e-mails by checking the communication time, so that the efficiency is improved when managing the accumulated transmitted or received image data. Moreover, transmitted or received image data is accumulated in the archive terminal device with each amount of setting data, so that it is convenient when the image data is managed with each amount of data.

A second aspect of the present invention is that a facsimile apparatus, which has a function of archiving image data transmitted by facsimile via an Internet after transmitting an e-mail attached to the image data to an e-mail address for archiving, archives image data only when receiving a delivery confirmation e-mail from the facsimile transmission via the Internet. Thus, whether or not saved image data reaches the destination can be easily identified, and the saved image data can be easily managed. Moreover, wasteful consumption of memory resources in the archive terminal device can be also reduced.

Additionally, the facsimile apparatus describes information of the delivery confirmation e-mail in the e-mail transmitted to the e-mail address for archiving. As the information on the delivery confirmation e-mail of the image data attached in the e-mail file accumulated in the archive terminal device is described in the main text of an e-mail, the transmission status of image data can be known in more detail.

BRIEF DESCRIPTION OF THE DRAWINGS

FIG. 3 is a diagram showing an example of an archive management record file.

DETAILED DESCRIPTION OF THE INVENTION

Figure 1:
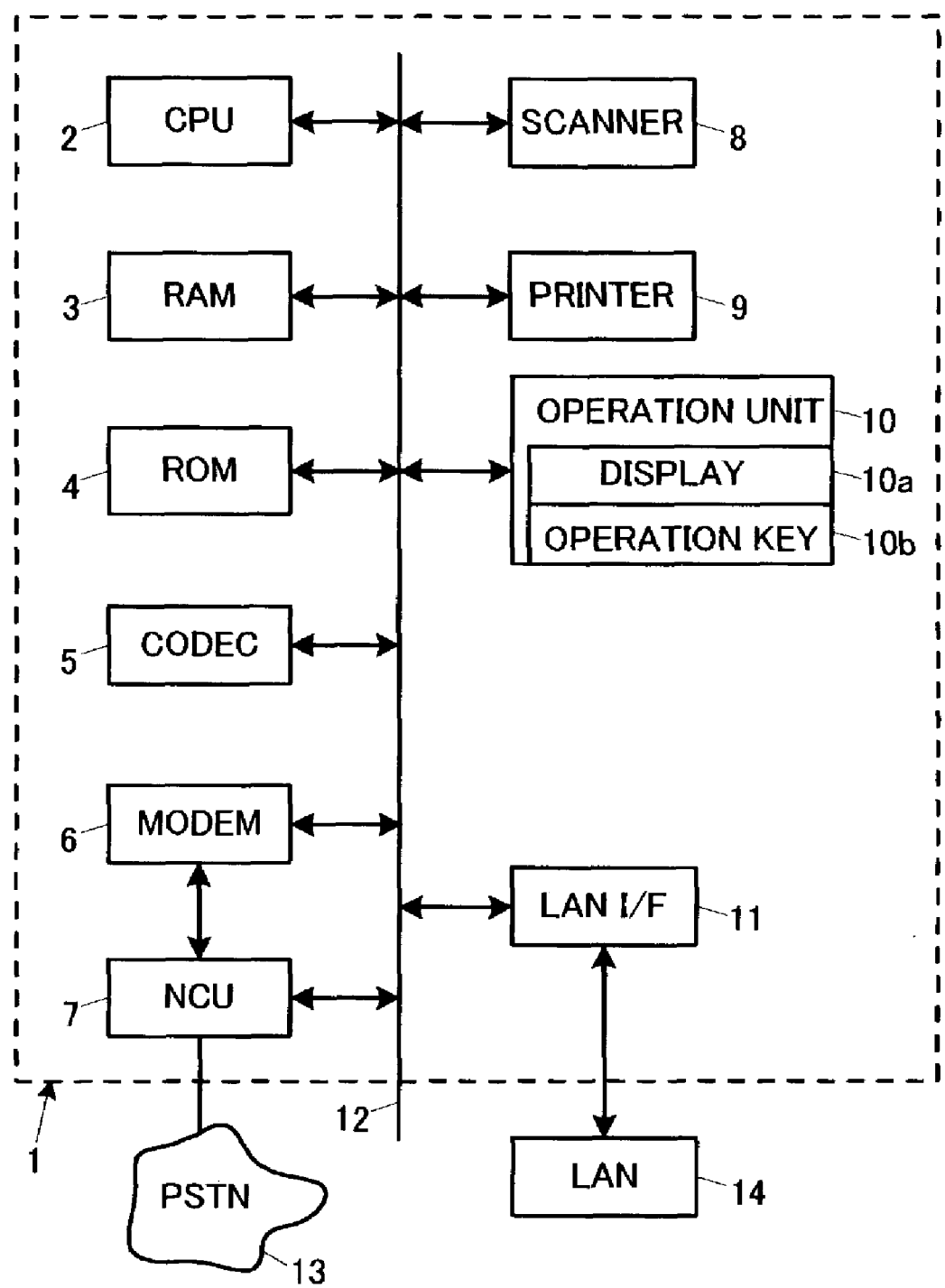
FIG. 1 is a block diagram showing an example of configuration of a facsimile apparatus in a first embodiment of the present invention.

Hereafter, a facsimile apparatus in preferred embodiments of the present invention will be described with reference to the drawings. The configuration of the facsimile apparatus will be shown in FIG. 1 in more detail. An Internet facsimile apparatus 1 has a CPU (Central Processing Unit) 2, a RAM (Random Access Memory) 3, a ROM (Read Only Memory) 4, a CODEC 5, a MODEM 6, a NCU (Network Control Unit) 7, a scanner 8, a printer 9, an operation unit 10, and a LAN I/F (Local Area Network Interface) 11. The parts 2~11 are connected to each other so as to communicate through a bus 12.

The CPU 2 controls each part of the facsimile apparatus 1 based on a predetermined program.

The RAM 3 is provided as a memory unit for storing a telephone number, an e-mail address, and a communication management record file as described later, in advance. Moreover, the RAM 3 functions as the memory unit for storing various data accumulated temporarily.

The ROM 4 stores various programs for controlling an operation of each part of the facsimile apparatus 1.

The CODEC 5 encodes and decodes image data based on a plurality of protocols. More specifically, the CODEC 5 encodes image data of a read document for transmission based on a MH (Modified Huffman), MR (Modified Read) coding schemes, etc., and decodes image data received from an external apparatus. Moreover, the CODEC 5 encodes and decodes image data based on a TIFF format (Tagged Image File Format), etc. that is an image format used commonly for a file attachable to an e-mail.

The MODEM 6 modulates transmission data and demodulates received data, based on the ITU-T (International Telecommunication Union) Recommendation V.34 or the like.

The NCU 7, which is a network control unit that controls telephone lines for making a call or breaking the connection, is connected to a PSTN (Public Switched Telephone Network) 13.

The scanner 8 has a function of reading an image of a document, and outputs the read binary format image data to a predetermined output destination at the instruction of the CPU 2.

The printer 9, which uses an electrophotographic system, prints received image data on a recording paper and discharges the recording paper. For example, the printer 9 prints the image data of the document read by the scanner 8 and the received image data, on the recording paper.

The operation unit 10 has a display 10a that shows information on a status of the facsimile apparatus 1 and a screen for instructing various operations, and a plurality of operation keys 10b for inputting telephone numbers, for specifying a destination by using a speed dial, for instructing to start to read a document, and for moving reversing display. Various operations are conducted through the operation unit 10.

The LAN I/F 11 has an Interface with a LAN 14, and connects the LAN 14 and the facsimile apparatus 1 so as to communicate.

Figure 2:
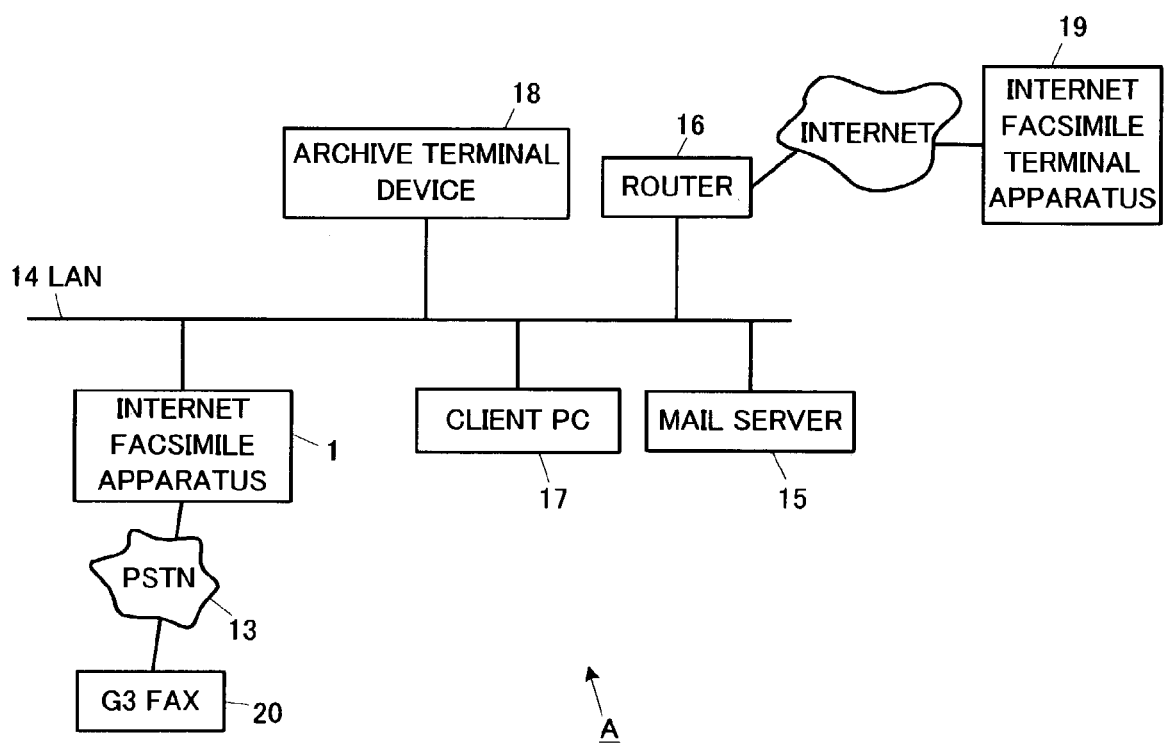
FIG. 2 is a block diagram showing an example of network environment in which the facsimile apparatus in the first embodiment of the present invention is installed.

The facsimile apparatus 1, has a facsimile function of transmitting or receiving image data encoded based on the MR, MMR (Modified Modified Read) coding scheme, etc., and also has an Internet facsimile function of transmitting or receiving image data attached to an e-mail, which is encoded based on the TIFF, JPEG (Joint Photographic Experts Group) coding scheme, by using an equipped TCP/IP (Transmission Control Protocol/Internet Protocol) that is an Internet standard protocol. As illustrated in FIG. 2, for example, the facsimile apparatus 1 is used in a network environment A. More specifically, the facsimile apparatus 1 is connected to an e-mail server 15, a router 16, a client PC 17, and an archive terminal apparatus 18 that can receive and accumulate e-mails, so as to communicate with each other through the LAN 14. Furthermore, the facsimile apparatus 1 is capable of transmitting or receiving image data to or from the e-mail server 15, other Internet facsimile terminal apparatus 19 via the Internet, etc., or a G3 facsimile apparatus 20 through the PSTN 13.

Moreover, the facsimile apparatus 1 has a function of saving (archiving) image data ("archiver function"), which is transmitted or received to or from the other Internet facsimile apparatus 19 or the G3 facsimile apparatus 20, in the archive terminal device 18, after transmitting the image data attached to the e-mail to the archive terminal device 18 (hereafter, the e-mail attached transmitted or received image data and transmitted to the archive terminal device 18 is called "e-mail for archiving"). The facsimile apparatus 1 then accumulates information such as the communication time, the destination (or source of message), the number of pages, the document size, and the communication result as the communication activity journal after transmitting or receiving image data, and forms a communication management record file (not shown in the drawings) that shows the content on a display or to the client PC 17 at the instruction of an operator, or an archive management record file 21 in which the e-mail addresses of archive destination are accumulated in the "archive destination" field in addition to the similar information, in a predetermined area of the RAM 3.

Furthermore, the facsimile apparatus 1 accepts and stores various settings in advance at the instruction of an operator, which is made through the operation unit 10 or the client PC 17, and creates and transmits e-mails for archiving based on the settings. For example, the time, the amount of transmitted or received image data accumulated in the apparatus, and the number of transmitted or received image data can be set as an execution time for creating and transmitting e-mails for archiving. Moreover, valid and invalid archiver function can be set. Furthermore, the facsimile apparatus 1 can be set to transmit a plurality of accumulated transmitted or received image data after attaching an e-mail, or to transmit one e-mail after attaching the entire transmitted or received image data.

The facsimile apparatus 1 also has a function of putting record information on transmitted or received image data to e-mail (hereafter called "e-mail for archiving") transmitted to the e-mail address for archiving after attaching transmitted or received image data, and a keyword added function for adding a predetermined keyword.

A keyword added to an e-mail for archiving received image data is described in a "Subject:" field of the e-mail address for archiving by using a determined keyword based on a keyword setting table as described later. Moreover, a keyword input in the operation unit 10 is used when an operator transmits image data, and is described in the "Subject:" field of the e-mail for archiving transmitted image data. Additionally, the keyword can be described in the main text or other parts of the e-mail header, as well as the "Subject:" field.

Figure 4:
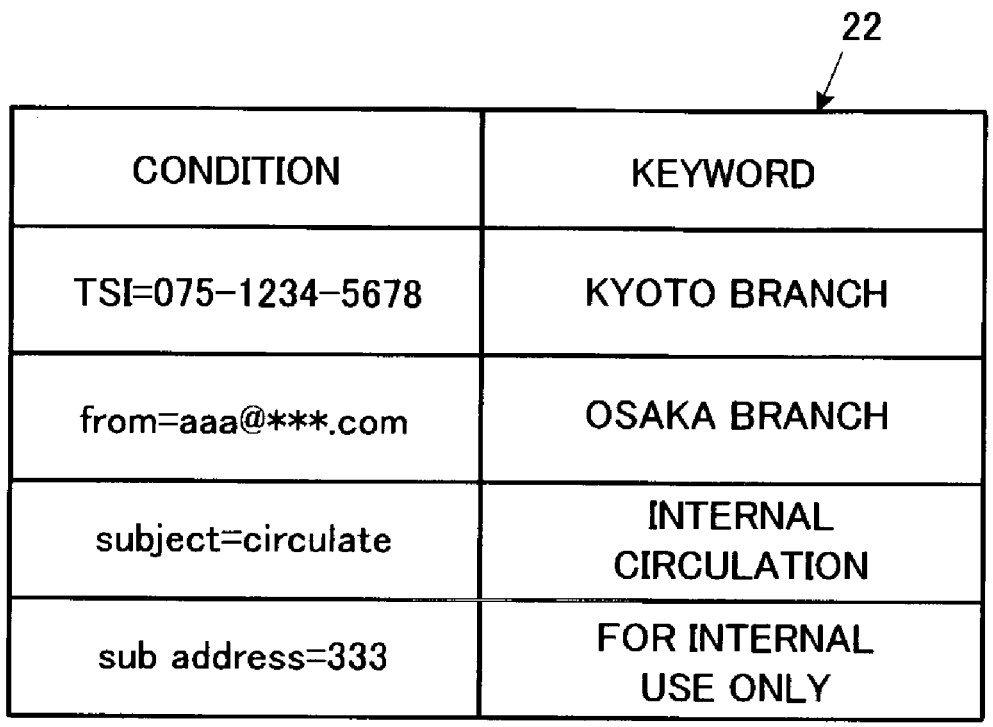
FIG. 4 is a diagram showing an example of a keyword setting table.

As illustrated in FIG. 4, for example, the keyword setting table is a table in which the contents can be edited by using the operation unit 10 and a client PC 24. The facsimile apparatus 1 forms the keyword setting table 22 in a predetermined area of the RAM 3, determines the keyword based on a condition set in a "condition" field, and describes it in the "Subject:" field of the e-mail header in the e-mail for archiving. For example, when the Internet facsimile apparatus 1 receives a facsimile or a facsimile via the Internet if the keyword setting table 22 shown in the drawings is formed, "Kyoto branch" is described in the "Subject:" field of the e-mail header in the e-mail for archiving when a telephone number of the source of received image data acquired from the TSI (Transmitting Subscriber Identification) is "075-1234-5678", "Osaka branch" is described in the "Subject:" field when the e-mail address of the source of image data facsimile received via the Internet acquired from the "From:" field is "aaa@***.com", "internal circulation" is described in the "Subject:" field of the e-mail address for archiving when "circulation" is described in the "Subject:" field of the received facsimile via the Internet, and "for internal use only" is described in the "Subject:" field of the e-mail for archiving when a sub address, etc. by a F code communication is "333". Additionally, the F code communication is a function for communicating by using a sub address and a password based on the ITU-T Recommendation.

Figure 5:
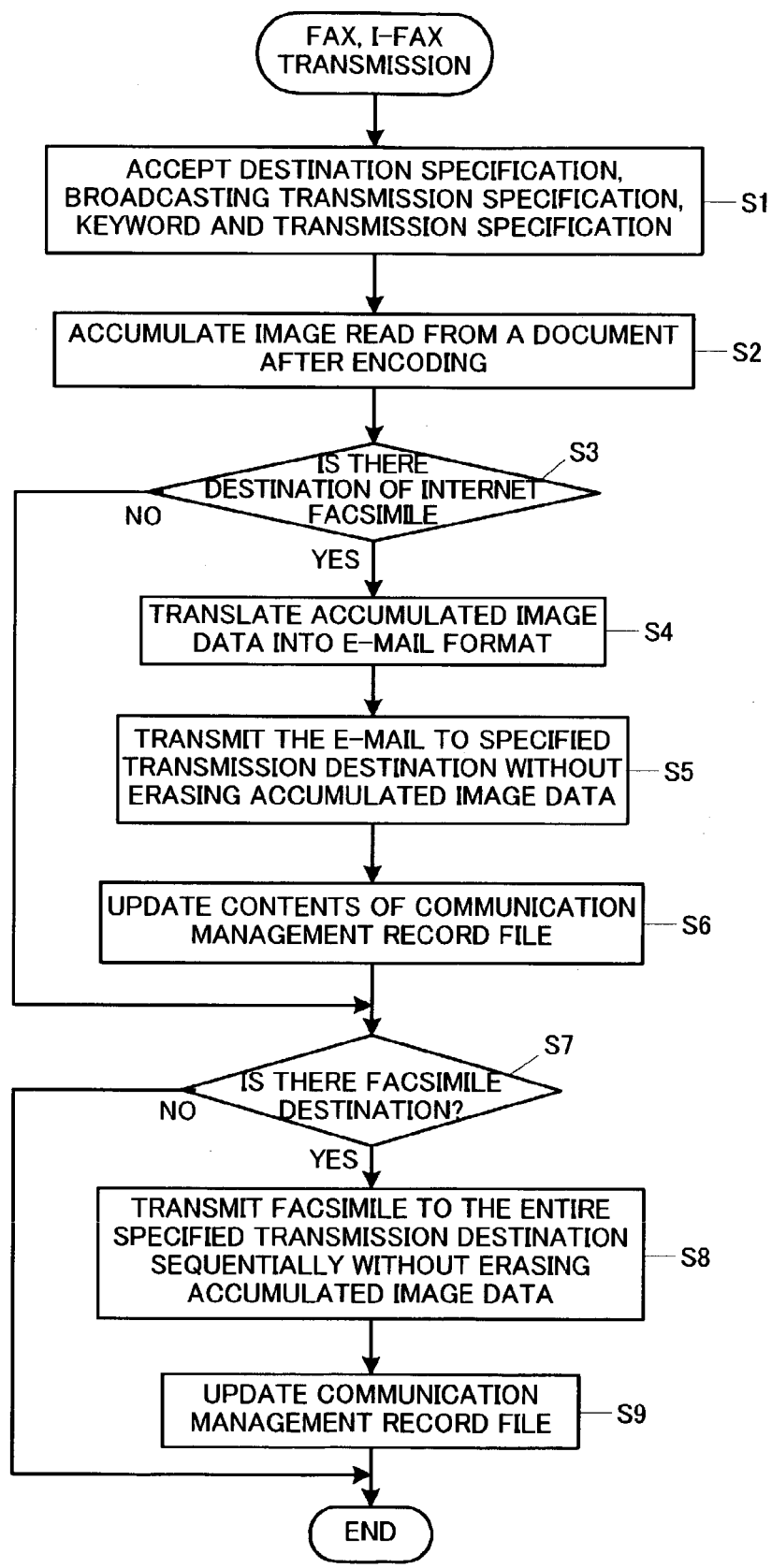
FIG. 5 is a flowchart showing an operation when the facsimile apparatus in the first embodiment of the present invention transmits a document (image data).

Next, an operation in case that the image data of a document is transmitted will be described with reference to FIG. 5. Additionally, an operation described based on a flowchart shown below in this specification is conducted at the instruction of the CPU 2, based on a control program stored in the ROM 4 in the Internet facsimile apparatus.

When an operator sets a document on the scanner 8 and specifies to transmit data by using a broadcasting function as well as a destination (a facsimile number, an e-mail address), a keyword should be described in the "Subject:" field of the e-mail address for archiving. A transmission specification should also be described. The Internet facsimile apparatus 1 accepts these specification (S1), and accumulates the image read from a document in a predetermined area of the RAM 3 after encoding to a predetermined format (S2).

Next, the CPU 2 determines whether the destination of the facsimile transmitted via the Internet, or the e-mail address is included in the destination specified by an operator in S1 (S3), and translates the accumulated image data into the image data that can be attached to the e-mail in the TIFF format if the e-mail address is included (S4). The facsimile apparatus 1 then transmits the e-mail to the specified sending destination (all of the destinations if the broadcasting transmission is specified), leaves image data of the accumulated document without erasing (S5), and updates the content of the communication management record file (not shown in the drawings) (S6).

When there is no destination of the facsimile transmitted via the Internet in S3 or after the process in S6 has not conducted, the CPU 2 determines whether the destination of the facsimile or the telephone number is included in the sending destination specified by an operator in S1 (S7), and the facsimile is transmitted sequentially to all of the specified telephone numbers and the image data of the accumulated documents is left without erasing if the telephone number is included (S8). After the facsimile has been transmitted to all of the destinations, the CPU 2 updates the content of the communication management record file (not shown in the drawings) (S9), and a series of transmissions are terminated.

Figure 6:
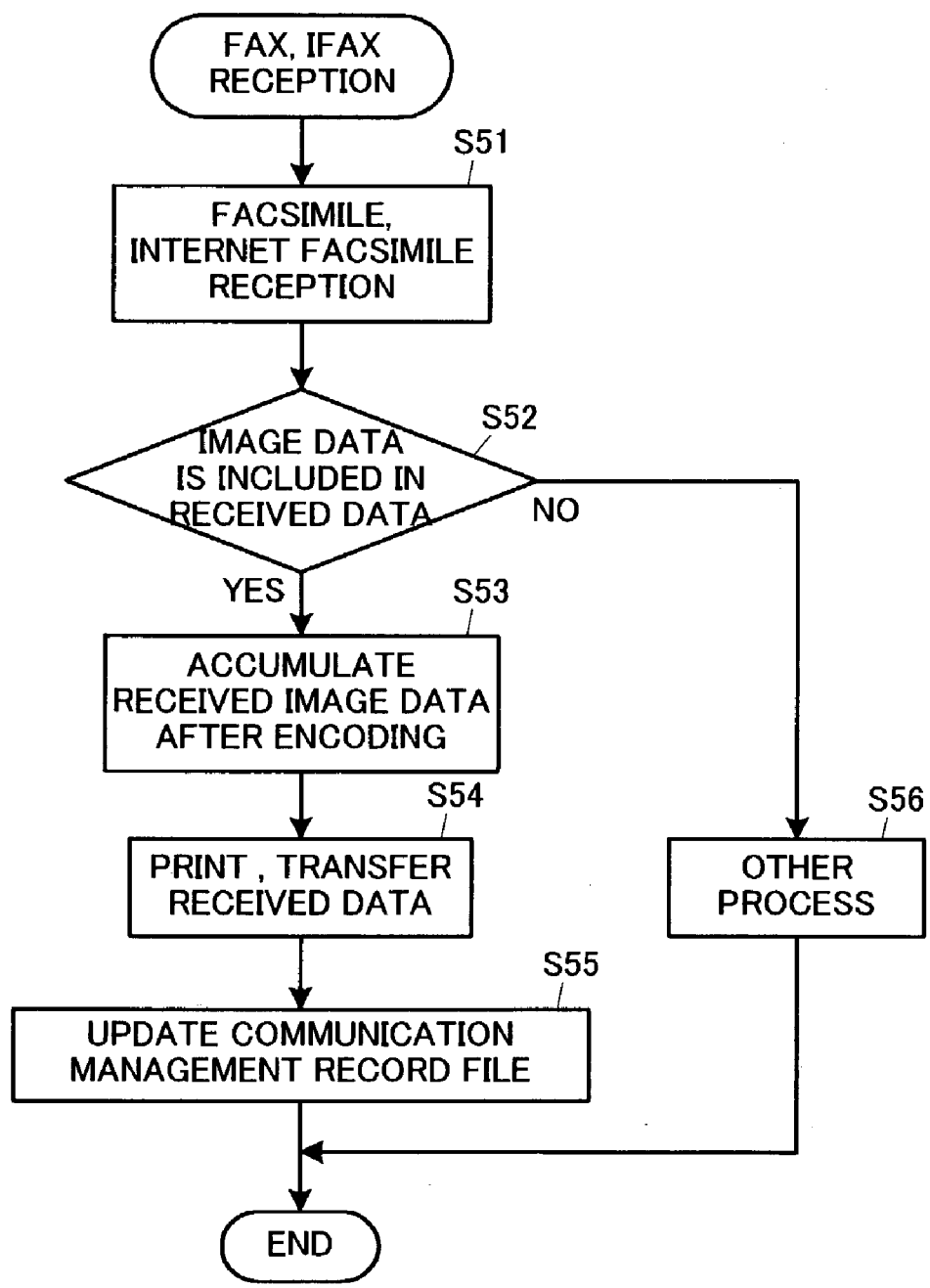
FIG. 6 is a flowchart showing an operation when the facsimile apparatus in the first embodiment of the present invention receives a document (image data).

Next, an operation in case that the facsimile apparatus 1 receives image data of a document will be described with reference to a flowchart of FIG. 6.

When the facsimile apparatus 1 receives image data by facsimile or by facsimile via the Internet (S51, S52), the received image data is encoded and accumulated (S53), the normal reception process such as printing and transferring the received image data is conducted (S54), and the communication record file (not shown in the drawings) is updated (S55). Moreover, when the CPU 2 determines that the image data is not attached to the data received via the Internet in S52, the process according to the various received e-mail is properly conducted (S56), and the operation is terminated. For example, when receiving an error e-mail, which informs that the facsimile transmitted via the Internet does not reach the destination, the facsimile apparatus 1 prints and displays an error message.

Figure 7:
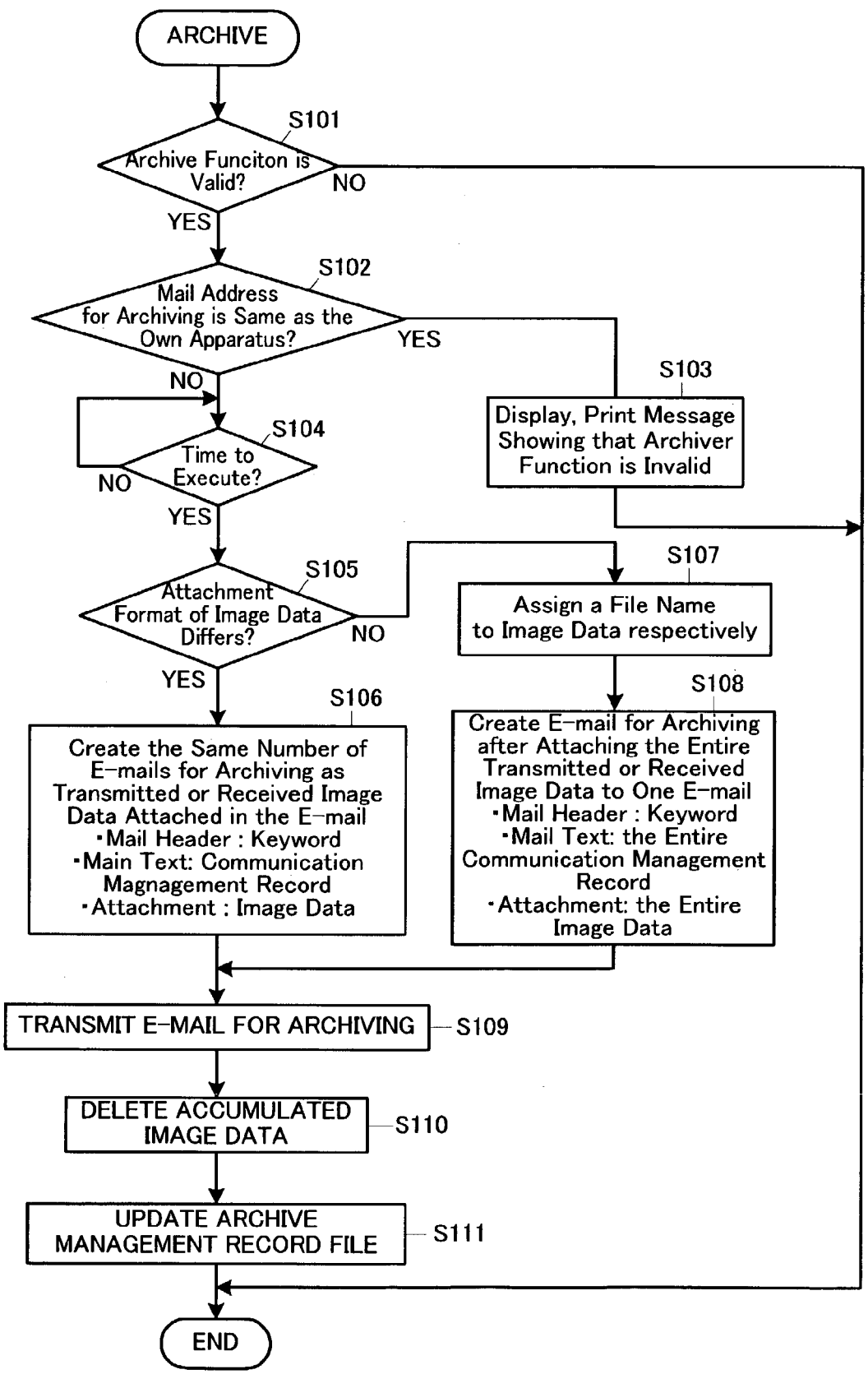
FIG. 7 is a flowchart showing an operation when the facsimile apparatus in the first embodiment of the present invention archives.

Next, an operation in case that the facsimile apparatus 1 archives image data transmitted or received as described above will be described. As illustrated in the flowchart of FIG. 7, when the setting of the archiver function is "valid" (S101), the CPU 2 determines whether the e-mail address for archiving registered by the apparatus setting in advance corresponds to the e-mail address of the apparatus before archiving (S102). When the e-mail address for archiving corresponds to the e-mail address of the apparatus, the CPU 2 outputs and displays a message such as "the data is not archived, as this Internet facsimile apparatus is specified as the archive destination", which means that the archiver function is "invalid" on the display 10a, the client PC 24, or the printer 8 (S103), and a series of operation is terminated. Thus, a loop e-mail that the facsimile apparatus 1 keeps on transmitting e-mails for archiving can be prevented.

Moreover, when the CPU 2 determines that the e-mail address for archiving is different from the e-mail address of the apparatus in S102, the CPU 2 stands by until the execution time comes (S104). The time, the amount of transmitted or received image data accumulated in the apparatus, or the number of transmitted or received image data accumulated in the apparatus is set as the execution time in advance by an operator, and the CPU 2 determines that the execution time comes when any item comes to a set value. For example, when the time is set and the set time is Dec. 1, 2001, the CPU 2 determines that the set time is the execution time. When the amount of data is set and the set amount is 10 MB, the CPU 2 determines that the point that the accumulated transmitted or received image data comes to 10 MB is the execution time. When the number of data is set and the set number is 100, the CPU 2 determines that the point that the accumulated transmitted or received image data comes to 100 is the execution time. When the CPU 2 determines that it is the execution time, the process goes to next (S105).

Figure 8:
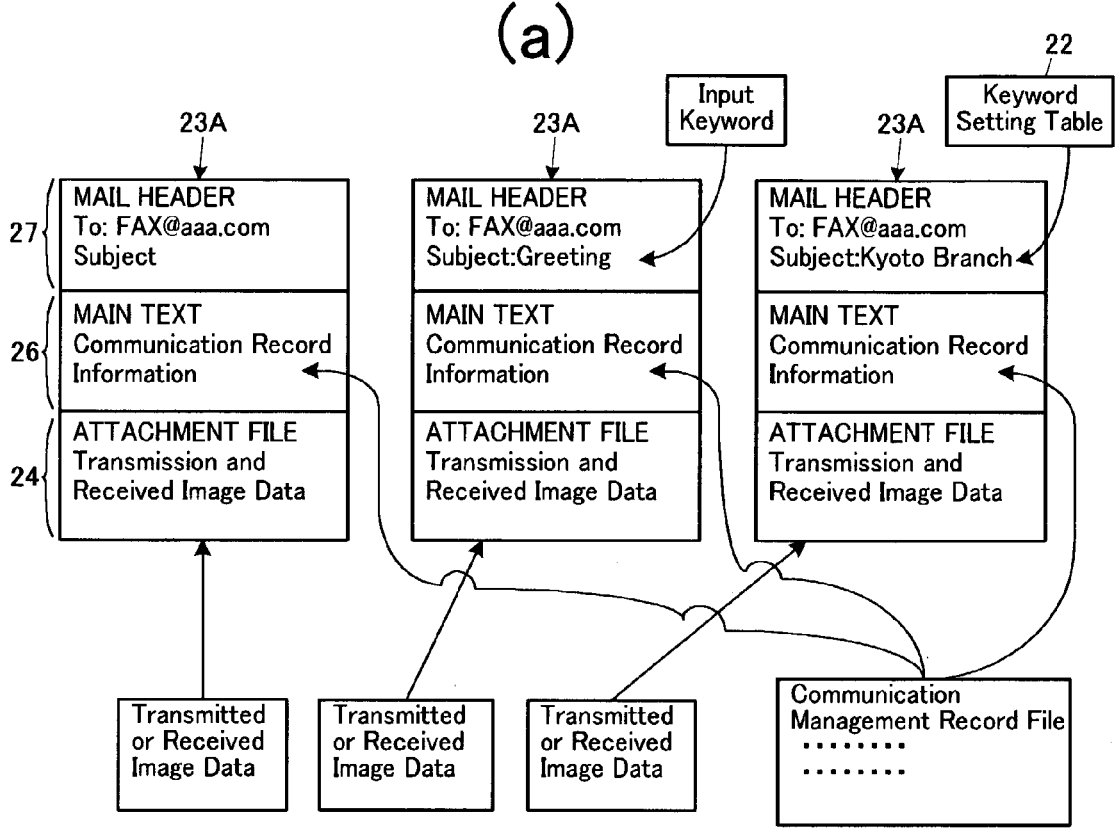
FIG. 8 is an explanation drawing when creating e-mail for archiving.
Figure 8:
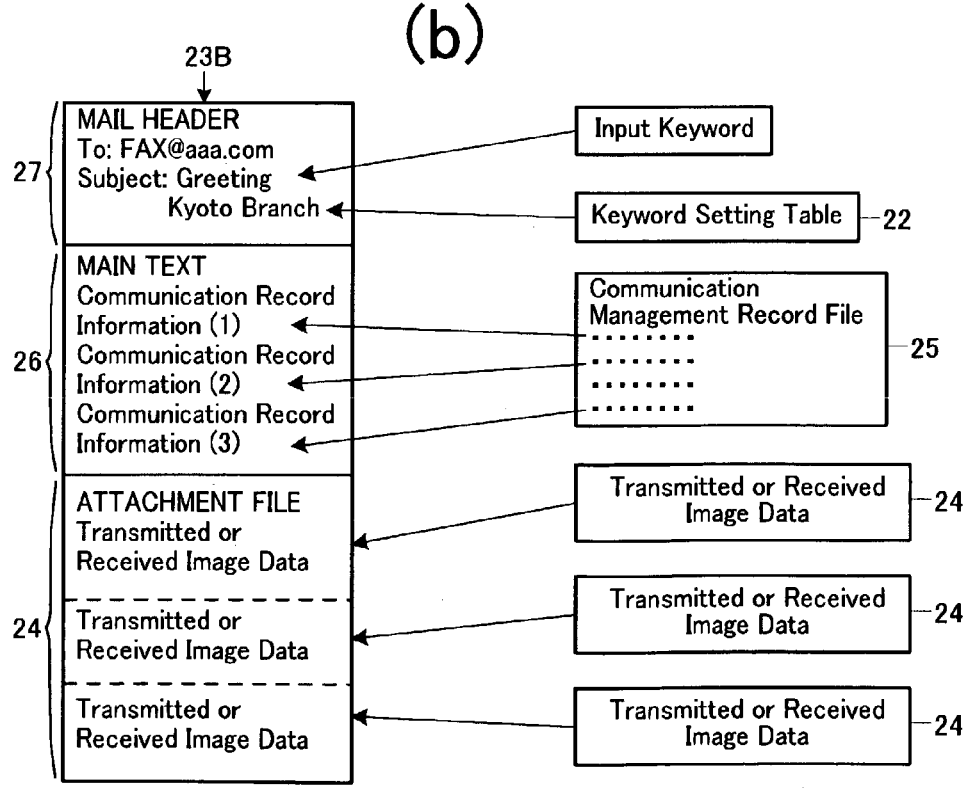

When the CPU 2 determines that it is the execution time, the CPU 2 next creates an e-mail for archiving based on an attachment format of the e-mail for archiving set by an operator in advance. More specifically, when the attachment format of image data is set such that "a plurality of transmission or received image data is transmitted by attaching to each e-mail" (S105), as illustrated in FIG. 8(a), the CPU 2 creates the same number of e-mails 23A for archiving as the accumulated image data by attaching to each e-mail. In other words, the CPU 2 describes the communication record information of the transmission and reception, extracted from the communication management record file 24, in a main text 26 with each accumulated transmitted or received image data 24, describes a keyword determined based on the keyword setting table 22 or the keyword specified to input in S1 in the "Subject:" field of an e-mail header 27, attaches the image data transmitted in S5 or S8 or the image data received in S51 in the main text 26 after translating into the TIFF format capable of attaching an e-mail, and creates the same number of the e-mail for archiving 23A as the transmission or received image data after the e-mail address for archiving registered in advance is described in the "To:" field of the e-mail header 27 (S106). Additionally, when accumulating only one transmitted or received image data, only one e-mail 23A for archiving is created.

When the attachment format of image data is set so as to "transmit one e-mail after attaching the entire transmitted or received image data" in S105, the CPU 2 assigns a name respectively to the image data 24 transmitted in S5 or S8 and the image data 24 received in S51 (S107). The communication time, the transmission and reception, and whether or not the communication is succeeded can be identified by seeing the file name assigned by the CPU 2. For example, the image data transmitted or received at 10:15:25 on Oct. 10, 2001 is assigned a file name, which includes the information showing the communication time such as "20011010_1525", the information for identifying the transmission and the reception such as "SEND", "REC", and the information that shows the success and failure (error code) of communication such as "OK", "T23". Moreover, the image data that can be transmitted at 10:15:25 on Oct. 10, 2001 is assigned a file name, which includes the information showing the communication time such as "20011010_1525_SEND_OK". Thus, the record information of the image data can be identified by seeing the file name of image data attached to the e-mail for archiving that is accumulated in the archive terminal device.

After assigning a file name respectively, as illustrated in FIG. 8(b), the CPU 2 creates one e-mail 23B for archiving attached to the entire transmitted or received image data 24. More specifically, the CPU 2 describes the communication record information of the entire accumulated image data extracted from the communication management record file 25 in the main text 26, and also describes the keyword determined based on the keyword setting table 22 and the keyword input and specified in S1 are described in the "Subject:" field of the e-mail header 27. The CPU 2 then attaches the entire accumulated transmitted or received image data 24 to the main text 25 after translating into the TIFF file that is the e-mail attachable format, and creates the e-mail 23B for archiving after describing the e-mail address for archiving into the "To:" field of the e-mail header 26 (S108).

Lastly, the facsimile apparatus 1 archives the entire transmitted or received image data accumulated by transmitting the e-mail 23A or 23B for archiving created in S106 or S108 to the archive terminal device 18 (S109). The facsimile apparatus 1 then erases the image data accumulated in S2 and S53, and updates the archive management record file 21 (FIG. 3) (S111).

Figure 9:
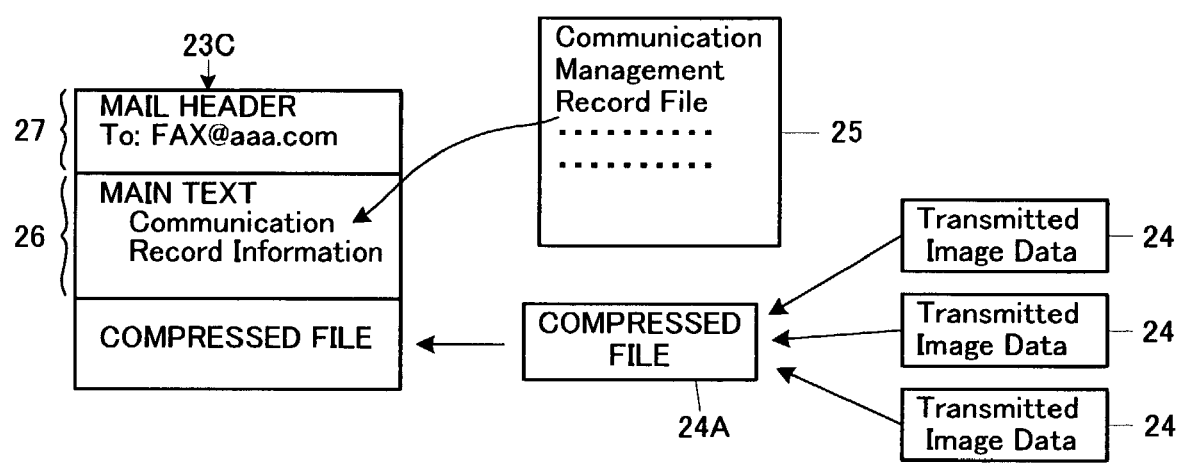
FIG. 9 is an explanation drawing when creating e-mail for archiving attached compressed image data.

As illustrated in FIG. 9, the plurality of transmitted or received image data 24 can be compressed by the "LZH" format, etc. and be attached to the main text 26 as one compressed file 24A when being attached to one e-mail such as the e-mail 23B for archiving. Thus, the memory resources of the archive terminal device 18 can be saved.

According to the facsimile apparatus 1 as described above, as the archive terminal device can archive the entire transmitted or received image data at a predetermined time, the operation and management of image data accumulated in the archive terminal device can be improved and efficient based on the execution time.

For example, the e-mail for archiving is accumulated in the archive terminal device with each day, week, or month if the time is set by day, week, or month when choosing the setting time, so that the transmitted or received image data can be operated and managed with each setting time. Moreover, as a plurality of e-mails for archiving transmitted all at once is unified as one in the archive terminal device when an operator sets so as to "transmit one e-mail after attaching the entire transmitted or received image data", the operation and management as described above becomes simpler.

There is also an advantage that the congestion status of the communications line in the daytime when the communication volume is apt to be increased can be improved as the setting time can be set in the night without setting in the daytime when the communications of the LAN 14 or via the Internet is apt to be congested.

When the execution time is the setting data volume, the entire e-mails for archiving attached transmitted or received image data of the setting data volume is accumulated in the archive terminal device, and the image data can be operated and managed with each data volume. For example, when a 100 MB media is used for creating a back up media of the transmitted or received image data accumulated in the archive terminal device, the back up operation can be conducted without being concerned about the total volume of the chosen image data when choosing the entire image data accumulated for a period of time by setting the setting data volume as 100 MB. Moreover, the entire e-mails for archiving transmitted to the archive terminal device is unified as one when setting so as to "transmit one e-mail after attaching the entire transmitted or received image data", so that the operation and management as described above can be simpler.

When the execution time is the setting number, the entire e-mails for archiving attached set transmitted or received image data is accumulated in the archive terminal device, and the image data can be operated and managed with the number of data. Moreover, the entire e-mails for archiving transmitted to the archive terminal device is unified as one when setting so as to "transmit one e-mail after attaching the entire transmitted or received image data", so that the operation and management as described above can be simpler.

Figure 10:
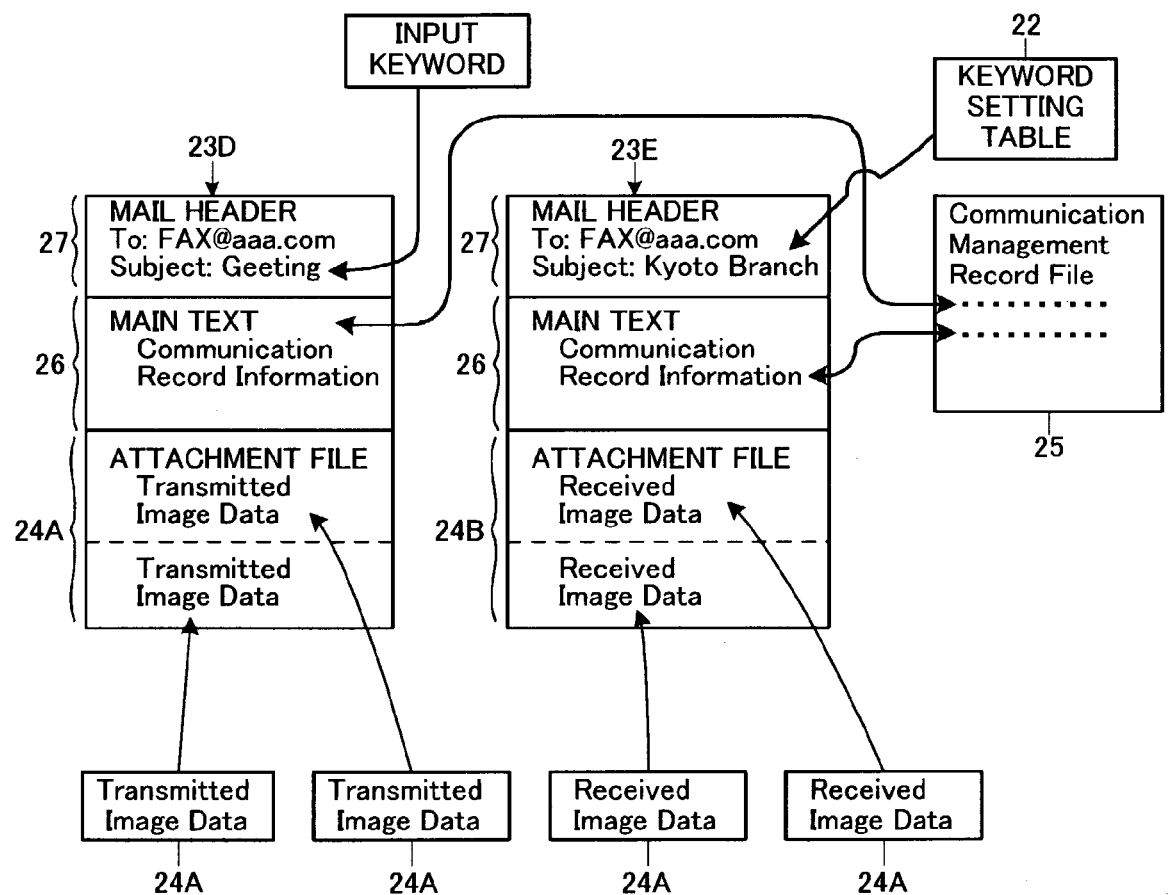
FIG. 10 is an explanation drawing when creating the e-mail for archiving with each transmission or reception.

Additionally, when setting so as to "transmit one e-mail after attaching the entire transmitted or received image" as the other setting, the transmitted or received image data can be archived by separate e-mails for archiving. More specifically, when setting so as to "transmit one e-mail after attaching the entire transmitted or received image data" as the attachment format of image data in S105, as illustrated in FIG. 10 in place of the e-mail 23B for archiving created in S108, the CPU 2 creates the e-mails 23D, 23E for archiving respectively, in addition to the e-mail attached the transmitted image data 24A and the e-mail attached to a received image data 24B, and transmits them to the archive terminal device 18. Thus, the transmitted and received image data are respectively attached to the e-mail file and accumulated, so that the transmitted and received image data can be easily identified, and the accumulated image data can also be operated and managed.

Next, a facsimile apparatus in a second embodiment of the present invention will be described. The configuration of the facsimile apparatus and the network environment used in the facsimile apparatus are same as the one in the first embodiment, so that the explanation is omitted.

The facsimile apparatus 1 has a function of transmitting image data transmitted to the other Internet facsimile terminal apparatus 19, etc. by facsimile via the Internet after attaching the image data to an e-mail, after receiving a delivery confirmation e-mail described later, and saving (archiving) the transmitted image data in the archive terminal device 18 (hereafter, the e-mail attached transmitted image data and transmitted to the archive terminal device 18 is also called "e-mail for archiving"). The facsimile apparatus 1 then accumulates the information of the communication time, the destination (source of the message), the number of pages, the size of a document, and the communication result as the communication record after transmitting the image data, and forms the communication management record file (not shown in the drawings) that shows the contents on the display or the client PC 17 at an operator's request and the archive management record file 21 in which the e-mail address of archiving the destination is accumulated in the "archive destination" field respectively in a predetermined area of the RAM 3, in addition to the information as described above, as illustrated in FIG. 3.

Figure 11:
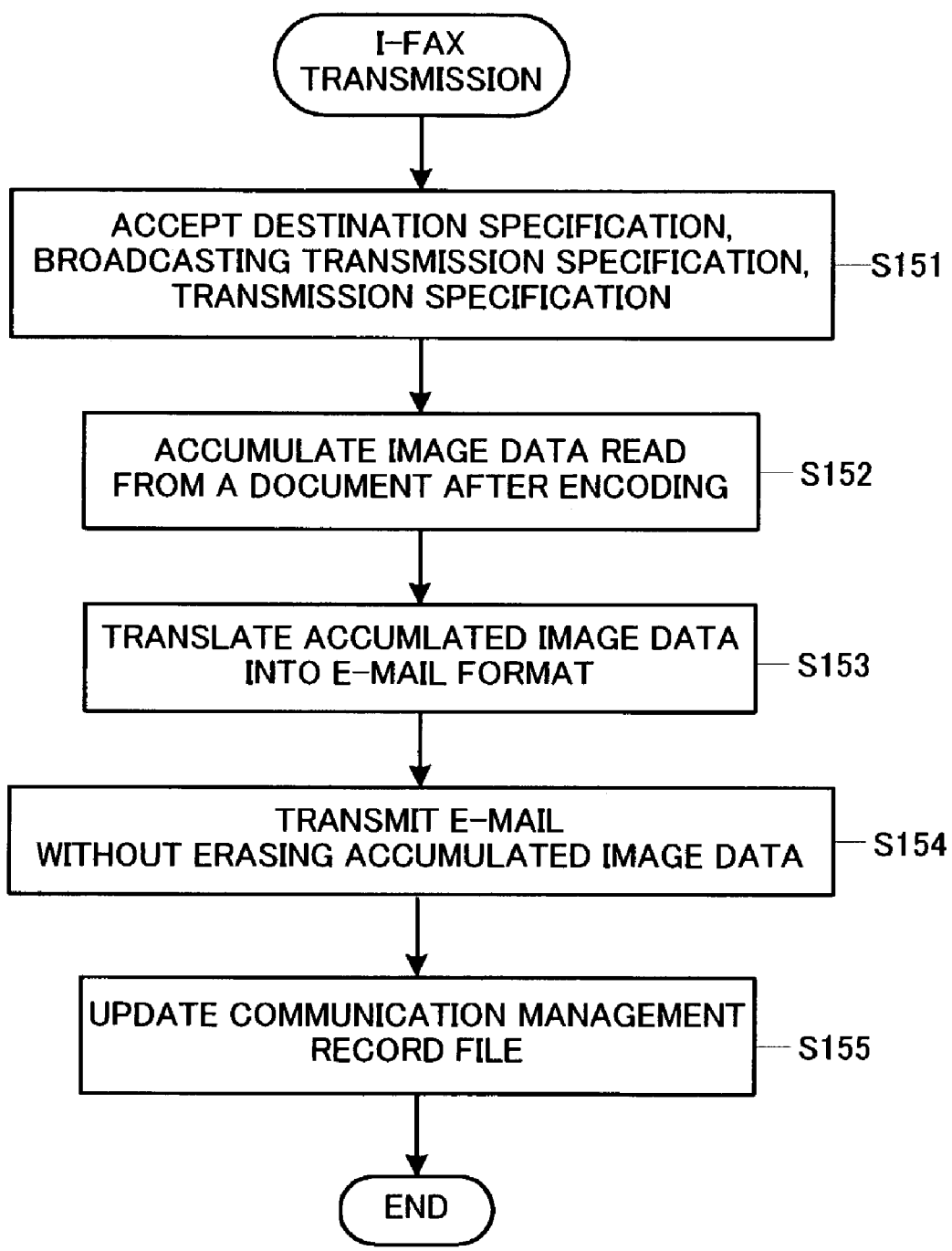
FIG. 11 is a flowchart showing an operation when a facsimile apparatus in a second embodiment of the present invention transmits image data of a document.

Hereafter, an operation in case that image data of a document is transmitted by using the facsimile apparatus 1 will be described with reference to a flowchart of FIG. 11. Additionally, the operation described with reference to the flowchart described later is conducted at the instruction of the CPU 2 based on the control program stored in the ROM 4 of the facsimile apparatus.

When an operator sets a document on the scanner 8, and transmits it after specifying the destination e-mail address for transmission, and using the broadcasting transmission function (function of transmitting facsimile to a plurality of destinations all at once), the facsimile apparatus 1 accepts the specification (S151), and reads an image of the document and accumulates the image data in a predetermined area of RAM 3 after encoding in a predetermined format (S152).

Next, the facsimile apparatus 1 translates the accumulated image data into the format that can be attached to the e-mail such as the TIFF format (S153), transmits the data to a specified destination by e-mail, and saves the data without erasing the accumulated transmitted image data in S152 (S154). Lastly, the contents of the communication management record file (not shown in the drawings) are updated (S155).

Figure 12:
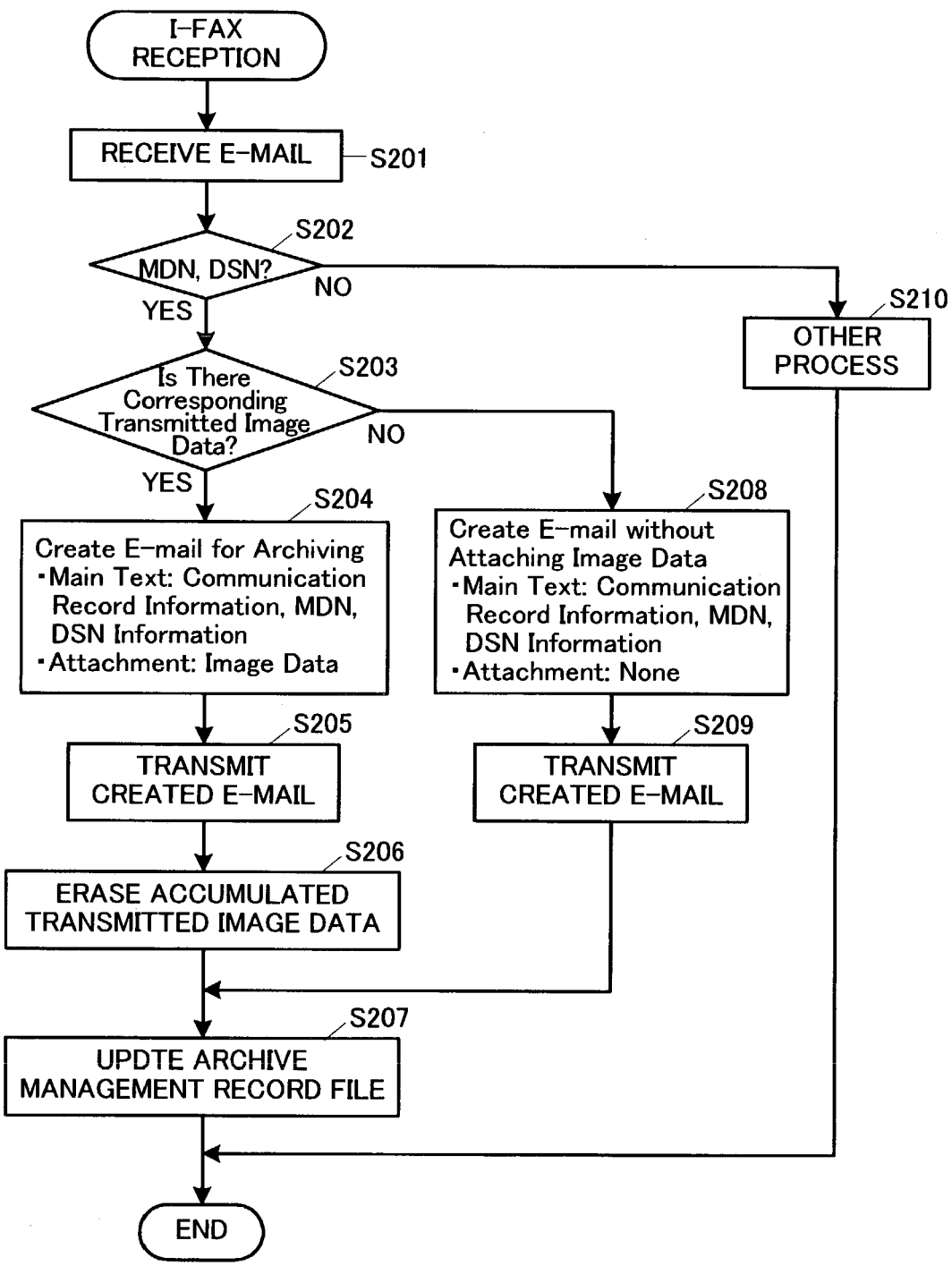
FIG. 12 is a flowchart showing an operation when the facsimile apparatus in the second embodiment of the present invention receives e-mail.

Next, an operation in case that the facsimile apparatus 1 receives an e-mail and the transmitted image data is archived will be described with reference to a flowchart of FIG. 12.

When receiving an e-mail (S201), the facsimile apparatus 1 determines whether or not the e-mail is a delivery confirmation e-mail such as MDN (Message Disposition Notification), DSN (Delivery Service Notification) (S202). The MDN, which is a message processing notification prescribed in RFC2298, is issued in the case that the destination terminal device receives an e-mail from a mail box and is processed. The DSN, which is a delivery status notification prescribed in RFC1891 and 1894, is issued from a MTA (Message Transfer Agent) when the e-mail is delivered to the destination mail box.

When the CPU 2 determines that it is the delivery confirmation e-mail in S202, the facsimile apparatus 1 determines whether or not there is corresponding data in the transmitted image data accumulated in the RAM 3, or whether or not the attached transmitted image data is accumulated in the e-mail corresponding to an original message ID described in the delivery confirmation e-mail (S203).

Figure 13:
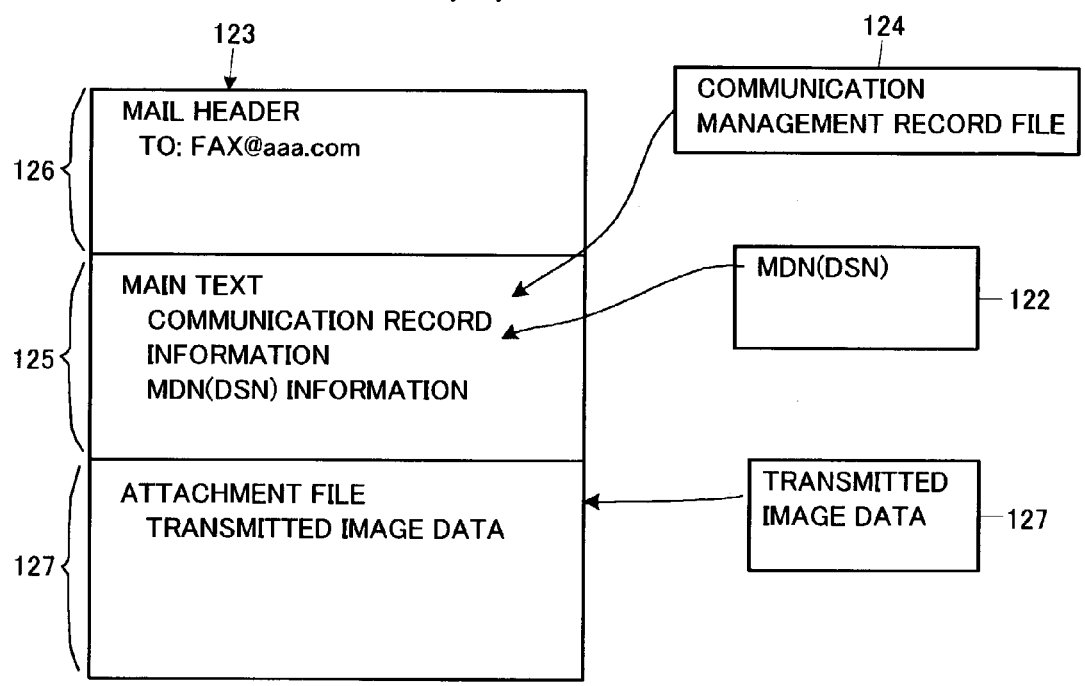
FIG. 13 is an explanation drawing of e-mail for archiving that is created after the facsimile apparatus receives a delivery confirmation mail.
Figure 13:
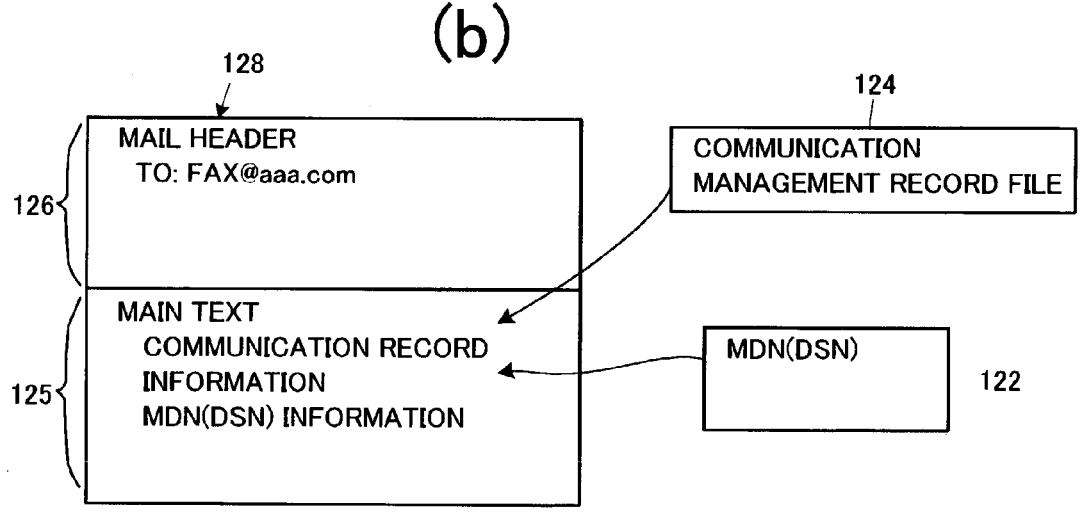

When there is the corresponding transmitted image data, the CPU 2 creates an e-mail 123 for archiving as illustrated in FIG. 13(*a*).

The CPU 2 describes the communication record information of the sending destination extracted from a communication management record file 124 (the communication record information on all of the broadcasting destinations when transmitting by using the broadcasting function) and the information described in the MDN (or DSN) in the main text 25. Moreover, the CPU 2 attaches a corresponding transmitted image data 127 to the e-mail, and creates the e-mail 123 for archiving by describing the e-mail address for archiving registered by the apparatus setting in advance in the "To:" field of an e-mail header 126 (S204). The facsimile apparatus 1 then transmits the e-mail 123 to the archive terminal device 18 (S205), erases the accumulated transmitted image data (S206), and updates the content of the archive management record file 21 (FIG. 3) (S207).

Moreover, when determining whether or not there is no transmitted image data corresponding to the CPU 2 in S203, as illustrated in FIG. 13(*b*), e-mail 128 is created, in which only the communication record information and the information such as MDN or DSN are described without attaching the transmitted image data 127 and the image data is not attached (S208). Likewise, the facsimile apparatus 1 transmits it to the e-mail address for archiving (S209), and updates the archive management record file 21 (FIG. 3) (S207).

When the CPU 2 determines that it is not the delivery confirmation e-mail in S202, the normal receiving process such as printing or delivering is conducted (S210).

As described above, only when receiving the delivery confirmation e-mail from the facsimile transmission via the Internet, the facsimile apparatus 1 archives image data, and does not archive the image data of the unreceived delivery confirmation e-mail. Thus, only the image data of a document that reached the destination is archived, whether or not the saved image data reaches the destination can be easily identified, and the saved image data can be easily operated. Additionally, when the delivery confirmation e-mail that should be replied to does not come for a long time or forever for some reason, the CPU 2 can erase the image data accumulated in the RAM 3 after the passing of a predetermined time so as not to affect a storage area of the RAM 3 in the facsimile apparatus 1 by the accumulated image data.

The facsimile apparatus 1 carries out a series of operation of S202~S207 when receiving the MDN or the DSN, however the DSN issued by the MTA is likely to be returned earlier than the MDN issued by the destination Internet facsimile apparatus 19. Thus, the Internet facsimile apparatus 1 does not carry out a series of operations of S202~S207 just after receiving the DSN, but carries out a series of operations of S203~S207 after waiting for a predetermined time in order to receive the MDN corresponding to the DSN. Moreover, when receiving the DSN and the MDN, the CPU 2 describes both the information in a main text of the e-mail 123 for archiving created in S204 or the e-mail 128 in which the image data is created in S208. When the MDN cannot be received in the predetermined time, the facsimile apparatus can be described only by the DSN information. Therefore, an operator can easily identify whether or not the reception process is completed by taking out the e-mail 123 for archiving or the e-mail 128 in which the image data is not attached from an e-mail box by the destination Internet facsimile apparatus 19.

What is claimed is:

1. A facsimile apparatus comprising:
    an image data communication unit that transmits and receives image data;
    an accumulation unit that accumulates transmitted and received image data;
    a memory that stores a keyword setting table including keywords associated with conditions;
    a transmission unit that transmits an e-mail including the image data accumulated in the accumulation unit to an e-mail address for archiving, wherein the facsimile apparatus determines a condition in the keyword setting table that matches a condition in the e-mail, and adds a keyword associated with the matching condition to the e-mail for archiving; and
    a controller that determines whether a predetermined execution time is coming and transmits the image data accumulated in the accumulation unit to the transmission unit.

2. The facsimile apparatus as in claim 1, wherein the predetermined execution time is a time when a present time is set.

3. The facsimile apparatus as in claim 1, wherein the predetermined execution time is a time when an amount of transmitted or received image data accumulated in the accumulation unit reaches a predetermined value.

4. The facsimile apparatus as in claim 1, wherein the predetermined execution time is a time when a number of communications reaches a set value.

5. The facsimile apparatus as in claim 1, wherein the image data communication unit is a facsimile communication unit that transmits and receives image data by facsimile.

6. The facsimile apparatus as in claim 1, wherein the image data communication unit is an e-mail communication unit that transmits and receives e-mails including image data.

7. The facsimile apparatus as in claim 1, wherein the transmission unit creates the email for archiving with each communication, and transmits it to the e-mail address for archiving.

8. The facsimile apparatus as in claim 1, wherein the transmission unit creates the e-mail for archiving that collects a plurality of communications, and transmits it to the e-mail for archiving.

9. The facsimile apparatus according to claim 1, wherein the keyword is added to a header of the e-mail.

10. The facsimile apparatus according to claim 1, wherein the condition in the keyword setting table is a telephone number or an e-mail address of a source of received image data.

11. A facsimile apparatus comprising:
    means for transmitting and receiving image data;
    means for accumulating transmitted and received image data;
    means for storing a keyword setting table including keywords associated with conditions;
    means for transmitting an e-mail including the image data accumulated in the means for accumulating to an e-mail address for archiving;
    means for determining a condition in the keyword setting table that matches a condition in the e-mail;
    means for adding a keyword associated with the matching condition to the e-mail; and
    means for determining wherein a predetermined execution time is coming and controlling so as to transmit the image data accumulated in the means for accumulating by the means for transmitting image data accumulated.

12. The facsimile apparatus as in claim 11, further comprising:
    means for counting a present time; and
    means for setting a predetermined time,
    wherein the means for determining determines whether or not the execution time is coming by comparing the present time counted by the means for counting and the time set by the means for setting.

13. The facsimile apparatus as in claim 11, further comprising:
    means for detecting the amount of image data accumulated in the means for accumulating; and
    means for setting a predetermined amount of data,
    wherein the means for determining determines that the execution time is coming when the amount of image data detected by the means for detecting comes to the amount of image data set by the means for setting.

14. The facsimile apparatus as in claim 11, further comprising:
    means for counting the number of communications; and
    means for setting a predetermined number,
    wherein the means for determining determines that the execution time is coming when the number counted by the means for counting comes to the number set by the means for setting.

15. The facsimile apparatus as in claim 11, wherein the means for transmitting and receiving image data is a facsimile apparatus that transmits and receives image data by facsimile.

16. The facsimile apparatus as in claim 11, wherein the means for transmitting and receiving image data is an e-mail communication device that transmits and receives e-mails including image data.

17. A facsimile apparatus comprising:
    a first transmission unit that transmits e-mails including image data;
    a memory that stores image data transmitted by the image data transmission unit, and that stores a keyword setting table including keywords associated with conditions;
    a reception unit that receives a delivery confirmation e-mail of the e-mail transmitted by the first transmission unit;
    a second transmission unit that transmits an e-mail including image data read from memory to an e-mail address for archiving, wherein the facsimile apparatus determines a condition in the keyword setting table that matches a condition in the e-mail, and adds a keyword associated with the matching condition to the e-mail; and
    a controller that controls the transmission of e-mails for archiving by the second transmission unit when the reception unit receives the delivery confirmation e-mail.

18. The facsimile apparatus as in claim 17, wherein the second transmission unit describes the information of the delivery transmission e-mail in the e-mail transmitted to the e-mail address for archiving.

19. A facsimile apparatus comprising:
    means for transmitting e-mails including image data;
    means for storing image data transmitted by the means for transmitting e-mails;
    means for storing a keyword setting table including keywords associated with conditions;

means for receiving a delivery confirmation e-mail of the e-mail transmitted by the means for transmitting e-mails;

means for transmitting e-mails for archiving including the image data read out from the means for storing to an e-mail address for archiving when the means for receiving receives the delivery confirmation e-mail;

means for determining a condition in the keyword setting table that matches a condition in the e-mail for archiving; and means for adding a keyword associated with the matching condition to the e-mail.

20. The facsimile apparatus as in claim 19, wherein the means for transmitting e-mails for archiving describes information of the delivery confirmation e-mail in the e-mail transmitted to the e-mail address for archiving.

21. A method for saving image data comprising:
transmitting and receiving image data;
accumulating the transmitted and received image data;
storing a keyword setting table including keywords associated with conditions;
determining whether a predetermined execution time is coming and transmitting an e-mail including the accumulated image data to an e-mail address for archiving;
determining a condition in the keyword setting table that matches a condition in the e-mail; and
adding a keyword associated with the matching condition to the e-mail.

22. The method according to claim 21, further comprising providing the predetermined execution time as a time when a number of communications reaches a set value.

* * * * *